SOMERBY & FOGG.
Car Brake.
No. 13,440.  Patented Aug. 14, 1855.
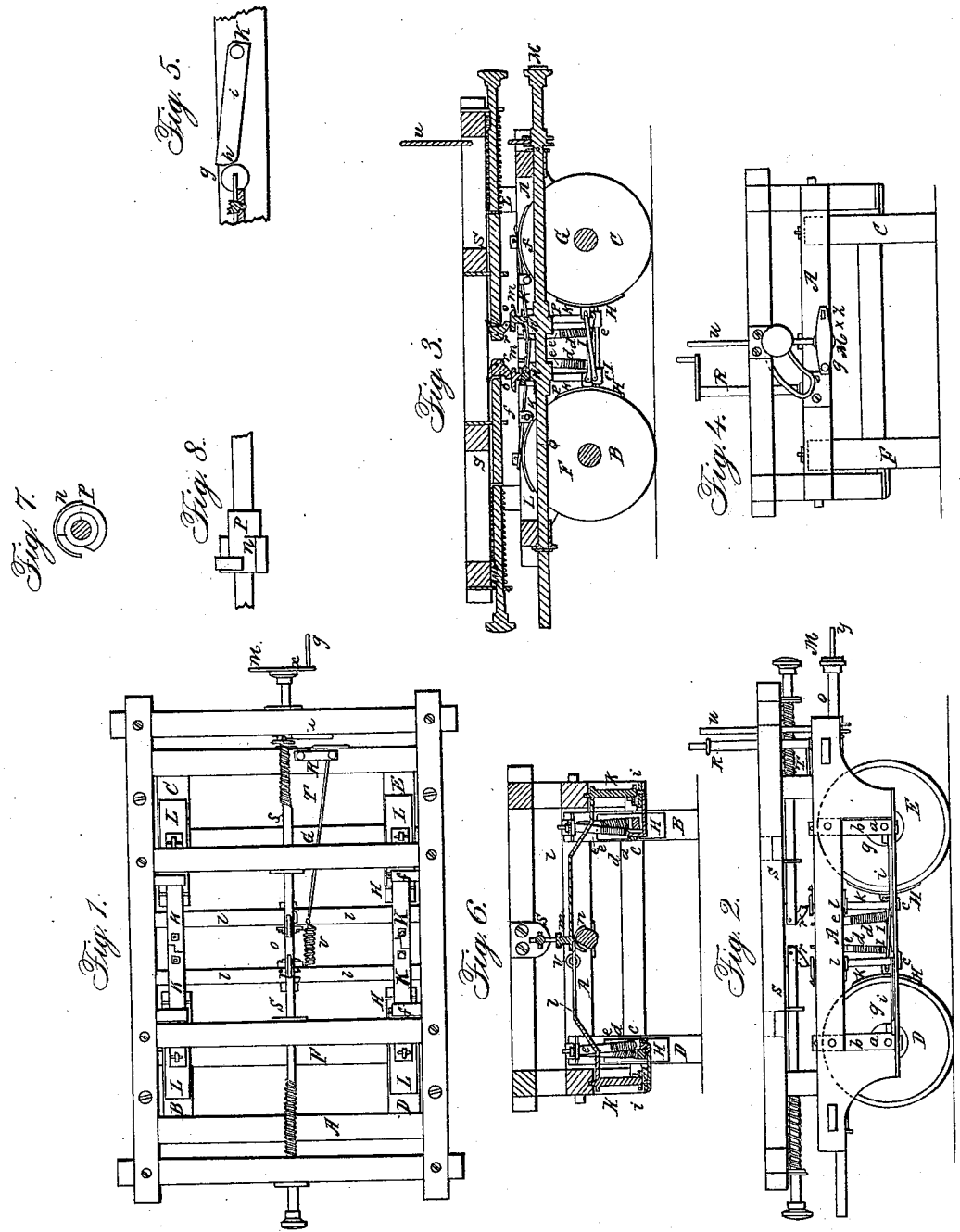

UNITED STATES PATENT OFFICE.

GUSTAVUS A. SOMERBY AND CHARLES W. FOGG, OF WALTHAM, MASSACHUSETTS.

RAILROAD-CAR BRAKE.

Specification of Letters Patent No. 13,440, dated August 14, 1855.

*To all whom it may concern:*

Be it known that we, GUSTAVUS ADOLPHUS SOMERBY and CHARLES WILLIAM FOGG, of Waltham, in the county of Middlesex and State of Massachusetts, have invented an Improved Brake Apparatus for Railway-Carriages; and we do hereby declare that the same is fully described and represented in the following specification and its accompanying drawings, of which—

Figure 1, exhibits a top view of a railway carriage truck frame containing our invention; Fig. 2, is a side elevation of the same; Fig. 3, is a vertical, central and longitudinal section and Fig. 4, is a front elevation of it.

A, in the drawings, denotes the truck frame; B, C, D, E, its wheels, and F, G, its axles; their journals, $a$, $a$, on each side of the truck, being respectively supported in pendulous bars, $b$, $b$, so applied to the truck frame as to enable the two axles to approach one another sufficiently to carry the wheels into contact with their respective working brakes H, H each of which is hinged or jointed to one of four levers I, I, I, I, arranged as seen in the drawings, the brake being at one end of the lever, while the fulcrum, $c$, of the lever is at its opposite end, and is jointed to the framework so as to permit the lever to play vertically. A rod, $e$, projecting down from a lever K, of a second brake or rubber L arranged on top of each wheel extends through the lever I, and a spring, $d$, and is supported by the spring while the latter rests on the lever, I.

Each of the levers K, has its fulcrum, $f$, arranged as seen in Fig. 3, and the two levers K, K, of each two wheels on either side of the truck, should be so connected, joined or made to overlap one another at their inner ends, that any upward or downward movement of one lever may produce a corresponding movement of the other, the same being for the purpose of enabling the upper brakes L, L, of both wheels to be simultaneously put in operation, by either of their working brakes, H, H. When the treads of the wheels are brought against the brakes, H, H, while the carriage is running on the railway, the friction generated, will cause the latter to lift the brakes and force into action the upper brakes, L, L, of both sets of wheels.

While the carriage is either at rest or in motion, its weight is employed to force the wheels against their brakes, H, H, provided such wheels are free, to move back against their said brakes. The weight of the carriage, when the bars, $b$, $b$, are inclined a little from the vertical in a direction toward the brakes, will act through the bars and force the wheels, against the brakes. This action of the weight through pendulous bars is of great importance and the employment of such bars in connection, with the wheels and frame in manner as described and so that the weight of the carriage may act through them as described is considered new. And besides this, we consider it new to apply the brakes, L, L, to the wheels so that they may be set in action on them by the upright brakes, H, H, as specified.

In connection with wheels made to move toward and away from their brake rubbers or working brakes, as specified, we employ a mechanism which by means of the power that produces draft of the carriage or puts it in motion on its track, shall move such wheels away from their brakes so as to relieve said brakes from being moved or pressed by their respective wheels. This mechanism or such as we have devised, may be described as follows. Each of the hanging bearings, $b$, of the wheel journal is provided with a horizontal friction roller, $g$, against which a cam $h$, see Fig. 5, (which is a top view of said cam and roller, and the lower arm of the lever, on which said cam is formed) is made to operate. The said cam is constructed upon the end of an arm $i$, that projects horizontally from a vertical shaft, $k$, (see Fig. 2) supported in suitable bearings so as to be capable of a horizontal rotation on its axis. From this shaft an arm, $l$, extends inward toward the middle of the truck frame, each wheel having its shaft provided with two arms as seen at $i$, and $l$.

Fig. 6 is a vertical and transverse section of the truck frame, the same being taken through two adjacent arms, $l$, $l$, when they are in line with, or about in line with one another. One of said arms has a vertical pin, $m$, extended through and fastened to it, and made to rest upon a cam $n$, the said pin being provided on its upper end with a catch, $o$, as seen in Fig. 3. The said cam, $n$, is raised on a barrel or cylinder $p$ as seen in Figs. 7, and, 8, which respectively are end and side views of said cylinder. There are two of such barrels, $p$, which are arranged and fixed upon the long shaft, $q$, as seen in Fig. 3. The object of the cam of each barrel is to elevate the catch o, of the arms, l, l, into the path of the tripping catch, r, which is arranged above the catch, o, and affixed to a sliding buffer shaft, s. There are two of these buffer shafts arranged as seen in Figs. 1, and 3, each being provided with a draw spring by which it is forced backward. A hand lever, a, extends upward from the long shaft, q. This hand lever serves to enable the shaft, q, to be turned transversely in its bearings. The cam, m, in one of the barrels, p, should be so arranged that while the lever, u, is being moved upward into a vertical position, such cam shall elevate the catch, o, into the path of the tripping catch. The other cam of the other barrel, p, should be so arranged as to cause the catch, o, over said barrel to be elevated to its highest position, when the said lever, u, is in a vertical position, and also so that, while said lever is being depressed from a vertical to an inclined position on the opposite side of the shaft, s, such cam shall admit of the fall or descent of the catch, o, below the path of movement of its tripping catch directly over it.

The arms, l, l, are severally made capable of being sprung or moved either upward or downward, those directly over each cam barrel, p, being so connected that a simultaneous movement of them, may always take place, when either is moved either vertically or horizontally. The said arms are connected by a spring, v, interposed between them as seen in Fig. 1, such spring serving to retract them whenever necessary. In case we should desire to relieve the wheels from the action of the brakes, the hand lever, u, is moved so as to cause the forward catch, o, to be raised upward. As soon as this takes place, the forward draft upon the front draw bar will so carry the tripping catch of said draw bar into action with the catch, o, directly beneath it as to move the lever arms of said catch forward and thereby cause the cams h, of the forward arms, i, i, to press upon their friction rollers, g, so as to cause the wheels to be moved away from their working brakes. In case the carriage is moving backward on a railway, the wheels are relieved from the brakes in a similar manner, and by the action of the rear draft bar and its tripping catch upon the rear catch o.

The front end of the long shaft, q, is provided with a clutch dog, M as seen in Figs. 1, 2, 3, and 4. This clutch dog consists of a cross bar x, affixed to the shaft and not only having a pin, y, projecting from one arm of it, but a slot or hole, z, formed through the other arm. Now when two carriages are brought together end to end, the pins, y, of their clutch dogs are made to pass into their respective slots, z, and so that a person when moving either lever, u, of any carriage shall simultaneously put, all the shafts, q of the carriages of the train, in motion, and so as to enable him to either throw all the brakes of the train, into or out of action upon their wheels, thus giving one man or any carriage of the train full command of the brakes of the train so that in case of accident or any necessity of a sudden stoppage of the train he can readily arrest the motion of it.

A windlass, R, and a chain or rope, T, may be arranged on the carriage as seen in the drawings, the rope or chain being attached both to the windlass and the arms, l, as seen in Fig. 1. By such windlass and chain, the wheels may be moved away from the working brakes, at any time whenever the carriage is not in train, but is running by power that may have been suddenly removed from it.

We do not claim the application of the brake to the wheel so that either may be made to move toward the other, while the carriage is in motion and whether by the momentum of the carriage or by any other power, but What we do claim is—

1. Applying the wheel axle to the frame by means of pendulous bars b, b, arranged substantially as described in order that the gravity or weight of the carriage, when the latter is at rest, (as well as when it is in motion) may be employed to press the wheels against the brakes by acting through such bars, when they are inclined from the vertical, and are left free to be moved toward the brakes.

2. We also claim so combining with either or both the lower brakes, H, H, operated by the wheels as described, one or more other brakes or brake mechanisms L, L, that the latter may be put in action by the operations of the wheels on the former as specified.

3. We also claim in combination with wheels applied so as to be movable toward and away from their brakes H, H, as specified, a mechanism substantially as described whereby the power that produces draft of the carriage or puts it in motion as described, shall move such wheels away from their brakes so as to relieve the said brakes from being moved or pressed by their respective wheels.

In testimony whereof we have hereunto set our signatures this eighteenth day of October, 1854.

GUSTAVUS ADOLPHUS SOMERBY.
CHARLES WILLIAM FOGG.

Witnesses:
R. H. EDDY,
F. P. HALE, Jr.